Jan. 20, 1959

N. MILLER

2,870,314

CONTROL DEVICE

Filed April 4, 1956

Inventor
Nicholas Miller
by Andrew B. Hubbard
Attorney

Jan. 20, 1959 N. MILLER 2,870,314
CONTROL DEVICE
Filed April 4, 1956 5 Sheets-Sheet 5

Inventor
Nicholas Miller
by Andrew L. Hubbard
Attorney

United States Patent Office 2,870,314
Patented Jan. 20, 1959

2,870,314

CONTROL DEVICE

Nicholas Miller, Chicago, Ill., assignor to General Electric Company, a corporation of New York Application April 4, 1956, Serial No. 576,211

15 Claims. (Cl. 219—20)

This invention relates to temperature control devices, and, in particular, to a temperature control device by means of which the thermal output of a heat source may be cycled to effect an average thermal output of as little as 4% or as much as 90% of the thermal rating of the source or, alternatively, may be maintained at its maximum rating.

It is conventional to employ a thermostatic device to control the heat energy applied to a process. In applications not requiring precise control, such as domestic cooking ranges, in which the heat energy source may be electricity or a gaseous fuel, relatively inexpensive bimetal or expansion bellows thermostats are used. Although these are generally adequate, they may produce wide amplitudes of temperature with respect to the desired temperature control level, because of the heat capacity of the bellows or bimetal systems. The cycling time of the control element of a thermostat may be materially shortened by using a tensioned wire in lieu of a bimetal or a thermostatic bellows system. The expansion and contraction of the tensioned metal wire as said wire heats with the passage of electric current therethrough, and cools upon the interruption of the electric current, may be employed to actuate contacts in an electrical circuit supplying the electric heating element, or a valve actuator in a gaseous fuel system. The advantage over the bimetal and expansion bellows types lies in having a low thermal mass operating element and, consequently, more rapid operation. Conventional "hot wire" thermostats have, however, certain basic disadvantages. For example, in such thermostats, there are errors resulting from the influence on the actuating wire of high ambient temperatures; there may be a "creep" or permanent change in the length of the hot wire when, under tension, it is subjected to long periods of high temperature, as required for operation of the thermostat to produce a high percentage of maximum thermal output of the heating device under control; the contacts of the control members are subject to excessive wear; and in the usual hot wire control thermostat, the wire is often under maximum stress at elevated temperatures, at which it is least able to withstand such stress.

Among the objects of the present invention, therefore, are to provide a rapidly cycling control device of the hot wire type; to provide a temperature control device of the hot wire type having inherent ambient temperature compensation; to provide a temperature control device in which the sensitive actuating wire is effectively "cut out of" the circuit when the device is used to maintain the heat source at continuous maximum thermal output; to produce a temperature control device in which the mechanical work required to be performed by the actuating wire is reduced at the higher temperature settings of the control device, whereupon when the actuating wire operates at the highest average temperature it is subject to less severe operating stress; and to provide a thermostat of the hot wire actuator type which is efficient when used in connection with a temperature sensing head responsive to the temperature of a utensil or chamber within which food is being processed.

In a present embodiment of the invention in which the several objects are realized in a device for controlling electrical energy supplied to a heating unit of the resistance type, a snap action switch mechanism is controlled by a tensioned wire, hereinafter referred to as a "thermal wire," which is mechanically associated with the switch mechanism and electrically connected in the circuit providing electric power for the heating unit. The thermal wire is also in parallel electrical relationship with a control circuit in which a temperature-sensitive resistance element has a relatively high temperature-resistance coefficient. Expansion and contraction of the wire resulting from the quantity of electrical energy flowing therethrough, as dictated by the resistance of the control circuit, operates the switch mechanism between open and closed circuit positions. When the switch opens, the flow of current to the wire is interrupted, whereupon the wire cools, contracts and recloses the circuit. A suitable control or adjustment device influences the control action in such a way that more or less elongation of the wire is required for opening the switch.

It is obvious that ambient temperature will affect the expansion and contraction of the thermal wire with resultant possibly faulty operation. I therefore provide an expansible and contactible supporting frame for the switch mechanism and the thermal wire, said frame being made of a material having a coefficient of expansion which will compensate for the ambient temperature effect.

The thermal output of the heating element is modulated by the energized and de-energized periods thereof, as established by the action of the tensioned thermal wire. In the specifica cooking unit control described herein, the heating and cooling of the wire is related to the temperature of the cooking vessel or chamber, whereby for a given setting of the adjustment means a substantially constant temperature will be maintained regardless of the quantity or nature of the material being cooked therein. Specifically, the thermal wire control circuit includes a temperature sensing device incorporating a by-pass resistance arranged to be in heat transfer relation with the vessel. The by-pass resistance comprises a material having a high temperature-resistance coefficient, whereupon as the temperature of the resistance material increases with the temperature of the cooking vessel, the current passing through the control circuit is reduced. This effects an increase in the amount of current passing through the thermal wire, causing it to heat rapidly with quick operation of the heating unit control switch to open circuit condition. Opening the heating unit circuit also opens the circuit to the thermal wire, which upon cooling and contracting, recloses the heating unit circuit, placing the wire again in an energized circuit in which the amount of current traversing the wire is determined by the temperature of the sensing device.

At the upper limits of temperature control, the thermal wire is not subjected to long periods of high internal temperature and high unit stress, and, therefore, the possibility of permanent "creep" deformation is substantially reduced. At low control settings, in which the resistance of the control circuit is low, the current drawn by the circuit is increased and that passing through the thermal wire lessened. Therefore, although the thermal wire may be subjected to longer energy periods, the temperature of the wire is sufficiently low to prevent permanent distortion.

Figure 1:
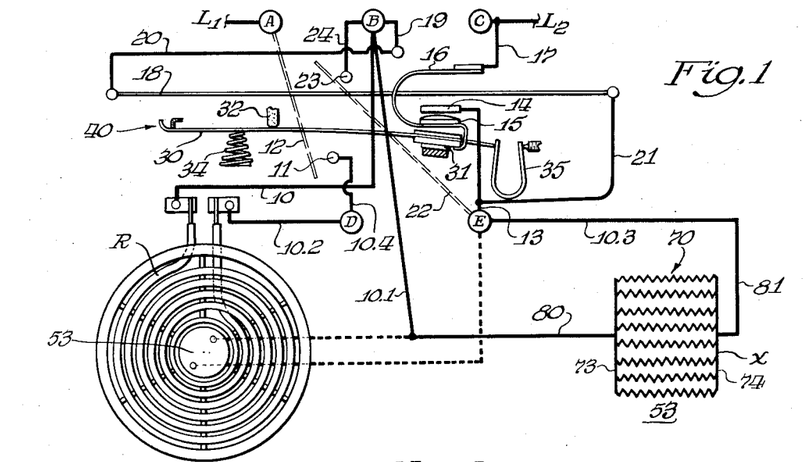
Fig. 1 is a schematic wiring diagram including a control embodying the present invention and a resistance element to be controlled thereby.

The mechanical construction of a thermostatic device embodying the present invention can best be understood after consideration of the circuit and operating diagram of Fig. 1. The line conductors L1 and L2 may be, for example, the conductors of a 236 volt, three wire Edison circuit normally used as the power source for an electric range having an automatically thermostatically controlled surface unit R, constituting an electrical resistance load to be controlled by the thermostatic device, as later explained. Line conductors L1 and L2 are respectively connected to thermostat terminals A and C; terminal B is a common connection point for one end of resistance load R and one end of the by-pass resistance X in the thermostat sensing head, later described, said connections being by way of conductors 10 and 10.1. The other ends of said resistances R and X are respectively connected, by conductors 10.2 and 10.3 respectively, to terminals D and E. Terminal D is electrically connected by a suitable conductor 10.4 to a fixed contact 11, which is an element of a single pole, single throw switch member 12. Switch member 12 may advantageously be a flexible blade-like member of spring temper commercial bronze strip, and has a contact 12.1 at the free end thereof. One end of switch member 12 is fixed to terminal A, whereupon switch 12 controls the circuit between terminals A and D and therefore between line L1 and one terminal of load resistance R. The other terminal of resistance R is connected to line L2 by way of conductor 10, terminal B, by-pass resistance X, conductors 10.3 and 13, mutually separable contacts 14 and 15, conductors 16 and 17 and terminal C. It will be seen that contacts 14 and 15 control the circuit between line conductor L2 and one side of load R, whereupon when said contacts 14 and 15 are open and switch blade 12 is disengaged from contact 11, the circuit to resistance R is open at both sides of the line. The thermal wire 18 is in a circuit which may be traced from line L1 through switch blade 12, contact 11, and conductor 10.4 to resistance R, then through said resistance R to terminal B, conductors 19 and 20 to wire 18, then through conductors 21 and 13 to switch contacts 14 and 15, then through conductors 16 and 17 to line conductor L2. Thus thermal wire 18 receives current whenever the contacts 11, 12, and 14, 15, are closed. In this connection, it may be observed that switch 12 is closed with its contact 11 at all times when the thermostat is in service, being opened only when the control is operated to its "off" position, as later explained. It will further be observed that resistance X is in electrical parallel with thermal wire 18, whereby the current drawn by wire 18 is related to the value of resistance X, as well known in the art. When, as later explained, the control is set to maintain the resistance R continuously at 100% thermal output, the thermal wire 18, by reason of its relatively high resistance, is shunted out of the circuit. This is accomplished automatically by means which close a switch blade 22, electrically connected with terminal E, against fixed contact 23, which is connected to terminal B by conductor 24. In the continuous heat setting, contacts 14 and 15 will be maintained in closed position, whereupon the circuit for the resistance R will be from terminal A through closed switch elements 11 and 12, resistance R, terminal B, conductor 24, switch elements 23 and 22, conductor 13, closed contacts 14 and 15 and conductors 16 and 17 to terminal C.

The normal cycling of the control is accomplished by translating the expansion and contraction of wire 18, as it heats and cools with the passage and interruption of current therethrough, into movement of a snap spring blade 30 (see Fig. 2) which carries at one end an insulated actuator element 30.3 operatively associated with the spring mounting 16 of movable contact 15 (see Fig. 8) to effect movement of said contact 15 relative to the fixed contact 14. The temperature range of operation of blade 30 is established by the relative position of an insulated button 32 (Fig. 2) to one face of blade 30 as established by the axial position of the adjustment screw 33, whereupon the pressure applied continuously by a spring 34 against the opposite face of the blade 30 causes a flexure of the blade and movement of the free end thereof, as more fully explained hereinafter.

Figure 2:
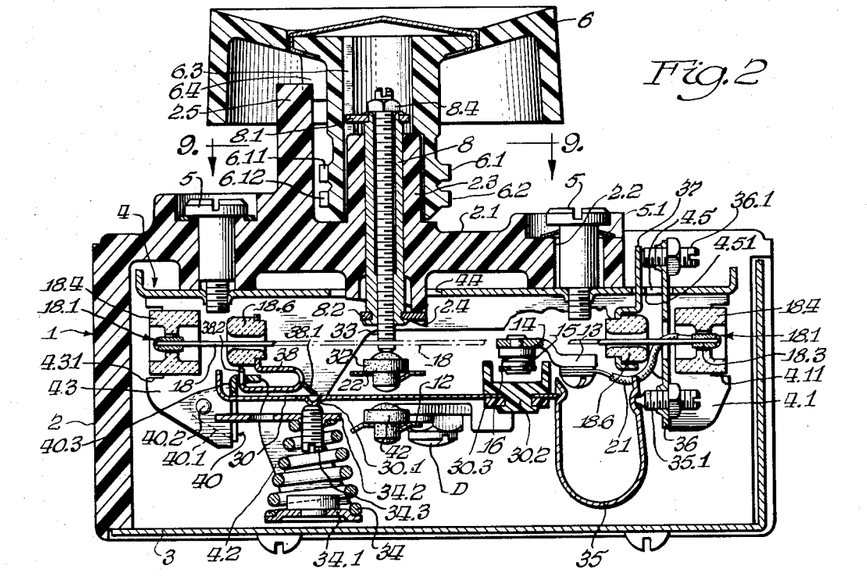
Fig. 2 is a side sectional elevation of the control device looking in the direction of arrows 2—2 of Fig. 5.
Figure 3:
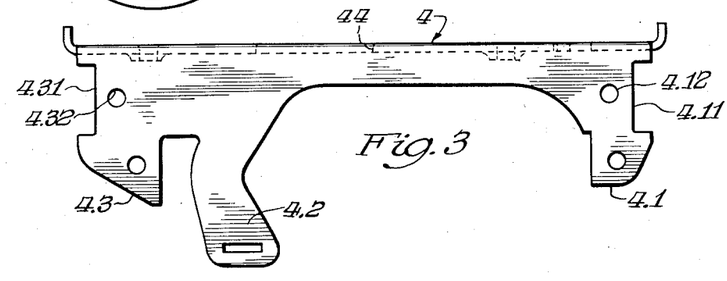
Figs. 3 and 4 are respectively a side elevation and a plan view of the main frame plate.
Figure 4:
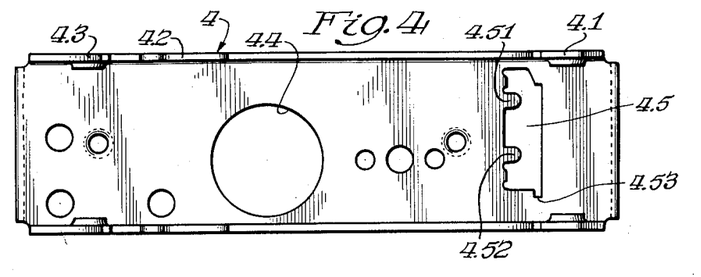

Referring now to Fig. 2, the control device 1 comprises a housing 2 which is preferably of electrically insulating material such as a suitable phenol condensation product, providing a structure open at one end and at the bottom. A removable metal closure plate 3 completes the housing. The mechanism within the housing is carried on a main frame plate 4 which is advantageously formed of quarter-hard strip steel. As best shown in the vertical elevation of Fig. 3, and the bottom plan view of Fig. 4, the frame plate has three pairs of downwardly extending flanges, respectively identified as 4.1, 4.2 and 4.3 which are support elements for various components of the control, as later described. The top of the frame plate has a large circular opening 4.4 and a transversely extending opening 4.5, the wall configuration of said opening 4.5 including the tabs 4.51 and 4.52 and a slot 4.53.

The frame plate 4 is fastened to the inner surface of wall 2.1 of the housing 2 in a manner permitting expansion and contraction of the plate relative to the housing. For example, as shown in Fig. 2, the plate is fixedly attached to the housing at one end by a screw 5 and at the other end is attached by a similar screw 5 which passes through an oversize opening 2.2 through the housing wall 2.1, whereupon the plate 4 is permitted longitudinal movement within the limits of the oversized opening. The opening 2.2 thus accommodates the expansion of plate 4. A spring washer 5.1 riding on the surface of wall 2 permits such movement while holding the plate 4 resiliently against wall 2.1.

Figure 2A:
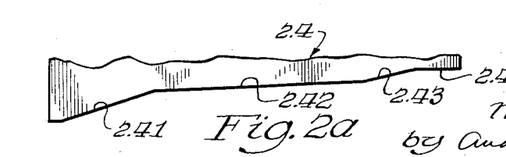
Fig. 2a is a developed view of the setting cam taken on the pitch circle thereof.
Figure 9:
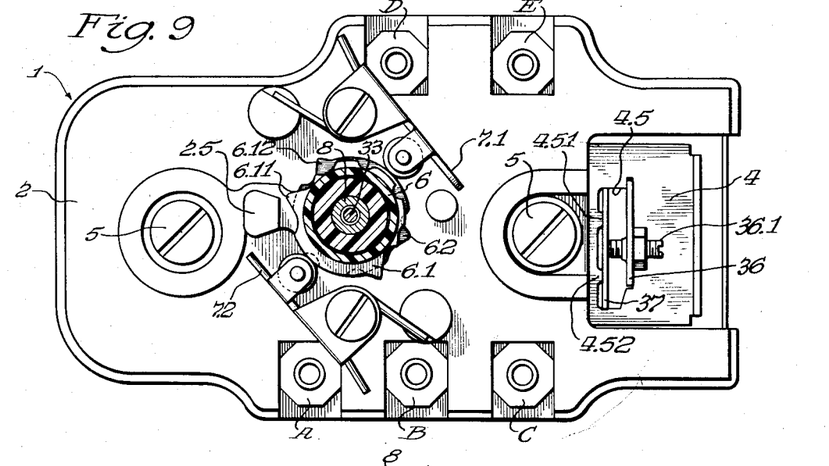
Fig. 9 is a top plan view, in section on lines 9—9 of Fig. 2.

The housing wall 2.1 is formed with a cylindrical neck 2.3 which rotatably accepts the hub of an adjustment knob 6. The hub of the knob has two rows of detents, respectively 6.1 and 6.2. Each of said rows has one or more circumferentially spaced notches such as the notches 6.11 and 6.12, Fig. 2, for cooperation with spring biased detents 7.1 and 7.2, shown in Fig. 9. The housing wall neck 2.3 rotatably receives a tubular shaft 8 having fixed to one end thereof a key plate 8.1 having a rigid finger portion extending into a keyway 6.3 of knob 6 whereby rotation of said knob effects rotation of such shaft 8. Shaft 8 fixedly carries at its lower end a cam plate 8.2 which rides on a helical cam surface 2.4 projecting from wall 2.1 concentric with shaft 8; whereby it will be obvious that upon rotation of knob 6 through an arc, the engagement of cam plate 8.2 on the surface of cam 2.4 causes an axial movement of shaft 8. As best shown in Fig. 2a, the cam 2.4 is configurated to have an initial relatively sharp slope portion 2.41 traversed by cam plate 8.2 as it rotates from an initial flat 5° portion into and through the next 90° of rotation, then a gradual slope 2.42 for approximately 180° of rotation, a second sharp slope 2.43 for approximately 45° of rotation, and a final level portion 2.44. Housing 2 has a post 2.5 with which a boss 6.4 on the knob engages to establish limits of rotation. The lower end of tubular shaft 8 is internally threaded to receive the male threaded end portion of the adjustment screw 33. The screw 33 may be given any desired initial axial displacement within the limits of its threaded portion relative to the tubular shaft 8 and may be secured in position by the lock nut 8.4.

Figure 5:
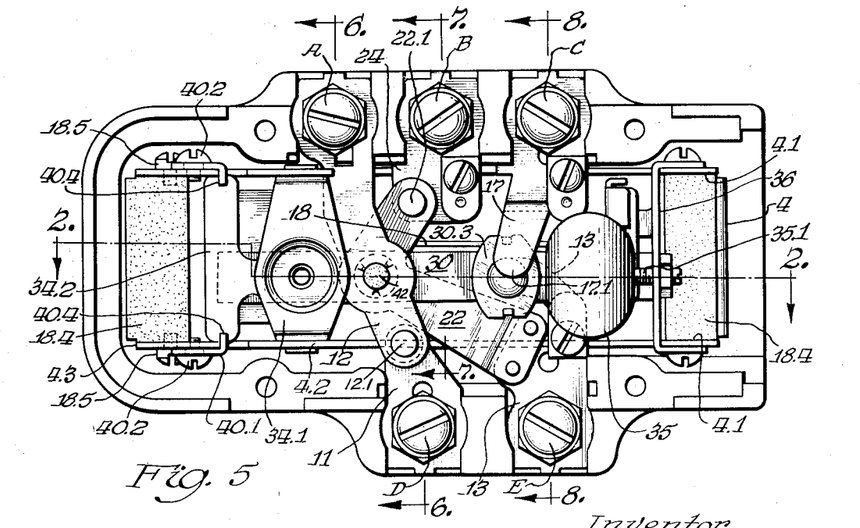
Fig. 5 is a bottom view of the control device with the bottom cover plate removed.

The contacts 14 and 15 (see Figs. 2 and 8) are arranged to assume a predetermined relationship when the movable contact 15 is disengaged by the spring blade 30. In the present embodiment, the contacts 14 and 15 assume a normally closed circuit relationship under such conditions. Fixed contact 14 is secured to the rigid conductor 13 which in turn is electrically connected to terminal E; movable contact 15 is carried by the springable conductor 16, fastened at one end to the rigid conductor 17 which is electrically connected to terminal C. The free end 16.1 of conductor 16 is bent back on itself to form an actuator for contact 15; and the free end 17.1 of conductor 17 extends inwardly of the casing to provide a stop, as later described. The electrical relationship of the contacts 14 and 15 is governed by the position of the adjacent end of the blade 30. The blade is mounted within the housing by the passage of an end of the blade between the legs 40.1 of a bracket 40 which is pivotally carried by the flanges 4.3 of the frame plate 4. Said pivotal mounting may comprise screws 40.2 passing through tapped holes in the respective flanges 4.3 and through untapped holes in the legs 40.1, as shown in Fig. 5. The upper surface of the blade 30 is maintained relative to the transverse member 40.3 of bracket 40 by means of the conical spring 34 which bottoms on a plate 34.1 extending between the flanges 4.2 of frame plate 4 and rigidly carried thereby. The spring carries at its upper end a plate 34.2, the opposite side edges of which are notched to receive short inturned flanges 40.4 at each side of the pivot bracket 40. Plate 34.2 mounts a screw 34.3 which bears against a dimple 30.1 formed in blade 30 whereby the effort of spring 34 induces a rotation of blade 30 about its fulcrum on the transverse member 40.3 of bracket 40.

Figures 6, 7, 8:
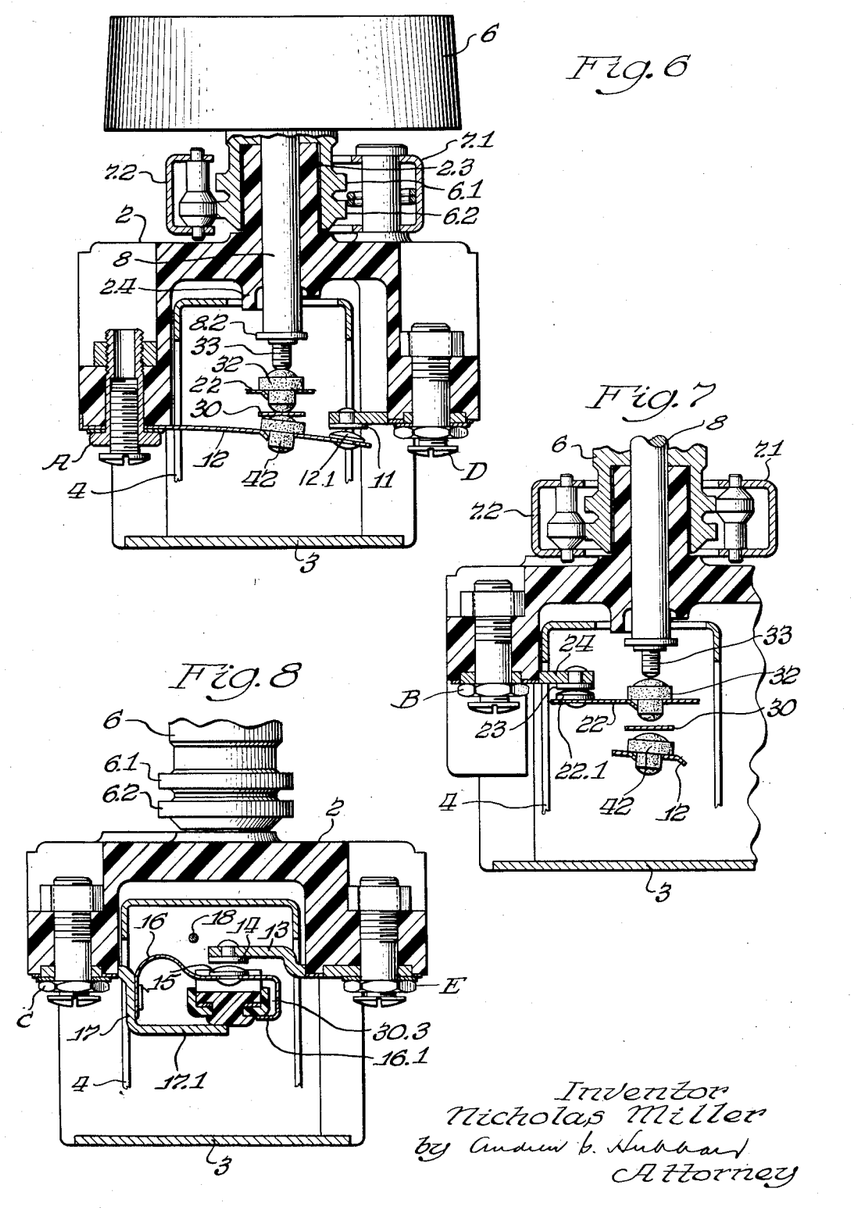
Fig. 6 is a sectional elevation, taken on lines 6—6 of Fig. 5, showing the control device in "off" condition.
Fig. 7 is a sectional elevation taken on lines 7—7 of Fig. 5, showing the device in "100% output" condition.
Fig. 8 is a sectional elevation taken on lines 8—8 of Fig. 5, showing the device in a normal cycling "off" position.

Adjacent its other end blade 30 is fitted with an insulated contact actuator 30.2 which advantageously comprises a molded member extending through the base of the actuator element 30.3. As shown in Fig. 8, said actuator element extends upwardly about the blade 30 and the base of the member 30.2 to secure said member against rotation. As shown in Fig. 2, the actuator 30.2 has upwardly extending side walls which embrace the contact 15 and the springable conductor 16 on which the contact is mounted. A snap spring 35 of U shape is interposed between the beveled free end of blade 30 and a screw 35.1 carried by a bracket 36 pivotally fixed to the lower portion of the respective side flanges 4.1.

Figure 12:
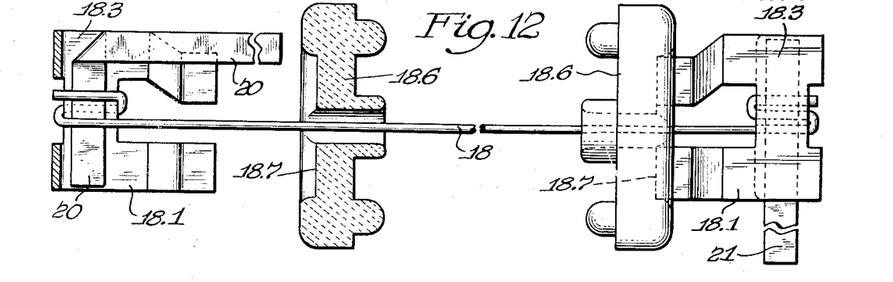
Fig. 12 is a disassembled plan view of the thermal wire and its mounting means.
Figure 13:
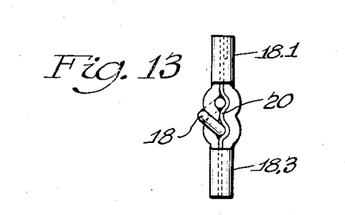
Fig. 13 is an end elevation of one of the thermal wire anchors.

Action of blade 30 in switch closing or opening direction is effected by the expansion and the contraction of the thermal wire 18 in response to the passage of electricity through said wire with the closure of contacts 14 and 15 or the interruption of such current as said contacts open. As best shown in Fig. 12, the wire 18, which may be 22 gauge standard commercial resistance wire comprising 80% nickel and 20% chromium, is secured at its respective ends to substantially identical forked terminal members 18.1. The electrical conductor 20 is attached to one terminal 18.1, and connects said terminal to main terminal B by way of conductor 19 (Fig. 1). Conductor 21 is connected to the other terminal and connects with conductor 13. The conductors 20 and 21 are advantageously of flexible silver strip.

The body portions 18.3 of the respective terminal members 18.1 extend slidably through a longitudinal opening in anchor guides 18.4, as best shown in Fig. 2. Said anchor guides are advantageously of moulded ceramic and extend across the frame plate 4 of which the respective end flanges 4.1 and 4.3 are notched (see 4.11 and 4.31, Fig. 3) to receive said guides. The guides are suitably secured relative to the frame plate as by set screws 18.5 passing through tapped openings 4.12 and 4.32 (Fig. 3) and entering side wall depressions in the respective anchor guides (Fig. 5). The forward edges of the rigid leg portions of each terminal member 18.1 are accurately formed to be symmetrical with the wire 18 and in mutual alignment at right angles thereto. The leg portions of each terminal member engage pivotally with a ceramic bearing member 18.6, which, of course, is slipped over the wire 18 prior to the assembly therewith of the terminal members 18.1. As best shown in the plan view of the assembled terminal member and bearing member at the right of Fig. 12, the legs of the terminal members seat against the base of a notch 18.7 formed in the bearing members 18.6.

The right-hand bearing member 18.6, as viewed in Fig. 2, is mounted to effect adjustment of the basic tension of wire 18, i. e., the tension as affected only by ambient temperature. For example, the bracket 36 (which is attached to the legs 4.1 of plate 4) extends upwardly through slot 4.5 in plate 4, and is additionally established relative thereto by seating within the notch 4.53 at the end of said slot. The free end of bracket 36 carries an adjustment screw 36.1. A lever 37 receives said right-hand bearing member 18.6, as best shown in Fig. 2. The projections 4.51 extend through openings in lever 37, and said lever is pivotally supported thereby. Adjustment screw 36.1 therefore effects a rotation of lever 37 according to the direction and extent of the adjustment of said screw 36.1. The resultant displacement of said bearing member 18.6 is transmitted to the wire 18, for it will be remembered that the leg portions of the adjacent terminal element 18.1 are in pressure engagement with the bearing member.

The left-hand element 18.6 (as viewed in Fig. 2) will rotate to a degree and in a direction as determined by the extent of expansion or contraction of wire 18 and the effort of spring 34. As shown, a rigid lever 38 carries said left-hand bearing element 18.6 and then extends in loop fashion to position a wide finger 38.1 against the surface of the blade 30 centrally of the screw 34.3. The finger 38.1 is shaped so that it has substantially a knife-edge contact with blade 30. The free end of lever 38 extends longitudinally of the blade 30 and terminates in a finger 38.2, which passes upwardly through a slot opening in a forwardly projecting flange which terminates the transverse member 40.3 of bracket 40.

It will be obvious that the effort of spring 34 against lever 30 is governed by the expansion or contraction of wire 18, acting through the bearing element 18.6 and the lever 38. Lever 38 is acting in opposition to spring 34. When the wire heats and expands, pressure of finger 38.1 on blade 30 is relieved, whereupon spring 34 enforces a counterclockwise movement to lever 38 about its point of pivotal engagement with bracket 40. When the wire contracts on cooling, lever 38 is forcibly rotated clockwise about flange 40.3, as viewed in Fig. 2, and finger 38.1 exerts effort against blade 30 and thereby exerts a compressive effort against spring 34.

The temperature range within which the contacts 14 and 15 are made and broken is established by the position of the insulated button 32 carried by switch blade 22. Said button 32 is disposed beneath the end of the screw 33 and will be displaced thereby as the adjustment shaft moves axially upon rotation of the knob 6. The switch blade 22 is inherently biased by spring 34 and its own resiliency to maintain the engagement of the button and the screw 33. As previously noted, switch arm 22 controls a normally open circuit between the terminal E and a fixed contact 23 (see Fig. 5), said circuit being closed only when the control device is in its "100% output" position, as later described. The position of the button 32 relative to blade 30 may be said to establish the datum length of the resistance wire from which departure will effect the movement of blade 30 into one or the other of its switch operating positions.

Figure 10:
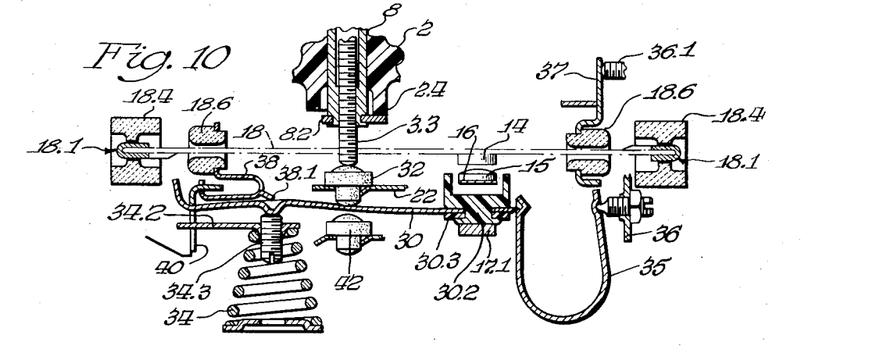
Fig. 10 is a somewhat schematic representation of the control device at low temperature adjustment.
Figure 11:
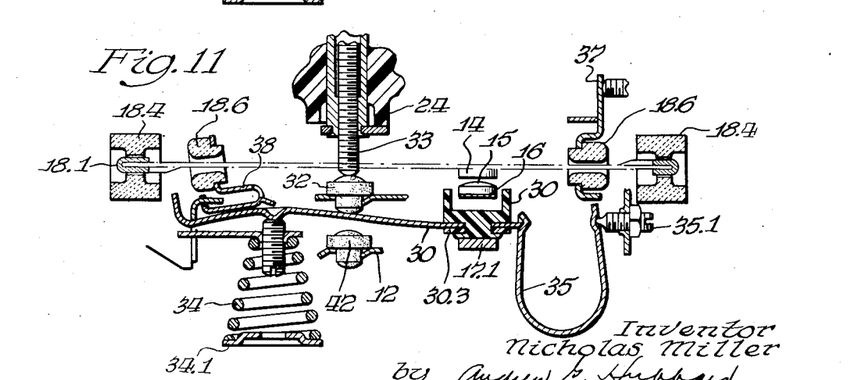
Fig. 11 is similar to Fig. 10, but showing the device at high temperature adjustment.

The Fig. 2 position represents a temperature setting near the low end of the temperature control range. The control knob has been rotated to a point where the cam follower 8.2 has nearly attained the portion 2.41 of helical cam 2.4; screw 33 has urged the button 32 toward the spring blade 30. The wire 18 has not yet increased in temperature substantially above ambient; the lever 38 is opposing expansion of spring 34 to the extent that blade 30 is substantially horizontal. Its end is in the upwardly thrown position of snap spring 35 and the contacts 14, 15 are closed. The closed contacts 14 and 15 have completed the circuit for energizing heating unit R and wire 18. As wire 18 heats and expands, the opposition of lever 38 to the spring 34 lessens, and spring 34 becomes effective to flex the portion of the blade 30 between bracket 40 and button 32. This, of course, has the effect of driving the free end of blade 30 downwardly through the overthrown position of spring 35. As the switch contact actuator 30.3 strikes the end 16.1, the contacts 14 and 15 are quickly opened. This is the Fig. 10 position. The circuit to wire 18 is opened thereby, and the wire cools and contracts. Its contraction rotates lever 38 and said lever exerts an effort against spring 34 which compresses the spring. This, obviously, removes the flexing effect which the spring 34 had exerted against blade 30, with the result that the blade straightens out. The free end of the blade rises. As the end of the blade passes through the overthrow point of spring 35, the contact mounting element 16.1 is released, whereupon the contacts 14 and 15 return to closed circuit position.

At a high temperature dial setting, the withdrawal of screw 33 permits the central portion of blade 22 to flex upwardly, carrying button 32 a relatively large distance away from blade 30. The thermal wire 18 therefore must expand to a substantial extent before the spring 34 can become effective to flex the blade 30 between the plate 40 and the button 32 sufficiently to cause the blade 30 to move to its circuit opening position. At the extreme high position adjustment, the thermal wire may attain approximately 1,000° F. in the few seconds of the "on" period, at which time the circuit is cut off by the action just described. In the extreme high temperature position, in which the switch cycles to produce approximately 90% of the full thermal output of resistance R, the contact on switch blade 22 remains separated from the fixed contact 23.

It will be apparent that it is the power of the contraction of the wire 18 which enforces the compression of spring 34 necessary for the return of the blade 30 to its contact-making position. It is an important feature of this invention that during high temperature operations, when the thermal wire 18 has the least tensile strength, spring 34 has had to expand to a substantial degree to operate the blade 30, and the resistance of said spring 34 to recompression is relatively low. Therefore, during operations at high control temperatures, the thermal wire, when it is at its highest temperature and weakest physically, is required to exert relatively less physical effort against spring 34 to effect the return of blade 30 to switch closing position.

It should be noted also that by supporting the movable contact 15 on a spring member independent of the blade 30, wear of the respective contacts does not change the initial throw of the spring blade 30. The contacts close by reason of the release of the spring member 16 carrying the contact 15; the spring blade 30 does not have to press the contact against fixed contact 14. The extent of movement of the blade 30, therefore, remains substantially constant regardless of the wear on the respective contacts.

There are two further operating positions of the control knob 6; an "off" position in which the spring blade 30 is mechanically actuated to a position holding contacts 14 and 15 open, and in attaining that position, separates switch blade 12 from contact 11, therefore opening both sides of the line and eliminating any shock hazard; and a "100% output" position in which the contacts 14 and 15 are maintained closed and switch blade 22 closes with contact 23 to shunt the thermal wire 18 and sensing resistance "X" out of the circuit.

The "off" position is attained by rotating the knob further in the low temperature direction; and as the "off" position is approached, the downward pressure on button 32 will have flexed the spring blade 30 downwardly about screw 34.2 until the contacts 14 and 15 have been separated. This disconnects line L2 from the load. Further downward flexure of blade 30, as the knob continues through the last few degrees of rotation to its ultimate "off" designation, brings the bottom of the blade 30 against an insulated button 42 carried by the spring switch blade 12, moving said blade downward, as viewed in Fig. 6, to separate contact 12.1 from contact 11 and thus break the circuit between line L1 and the resistor R. The helical cam 2.4 is shaped to carry the mechanism abruptly through this final part of the movement to the "off" position.

Attainment of the "100% output" position is accomplished by rotating the knob 6 to its ultimate position in the opposite direction. As it moves in this direction, the shaft 8 withdraws to a position where screw 33 disengages from button 32, permitting the contact 22.1 at the end of the spring blade 22 to close with contact 23, as shown in Fig. 7. The withdrawal of button 32 relative to blade 30 permits spring 34 to rotate blade 30 to close contacts 14, 15. As is apparent from Fig. 1, a direct path is thus provided from line L1 through closed switch elements 12 and 11 and conductors 10.4 and 10.2 to one side of resistor R, then from the other terminal of resistor R and conductor 10 to terminal B, conductor 24, closed contacts 23 and 22 to terminal E, then through conductor 13, closed contacts 14 and 15 and conductors 16 and 17 to line L2. Thermal wire 18 and resistance X are shunted out. Wire 18 is thus absolutely protected against exposure to prolonged high temperatures. The detent rollers 7.1, 7.2, and the cooperating notches 6.11 and 6.12 operate to bring the switch knob 6 to the final position in positive manner and help to prevent the knob from coming to rest in an intermediate position.

High ambient temperatures could introduce an error in the control by increasing the expansion of wire 18 beyond that resulting from the passage of current therethrough. Such potential error is obviated by supporting the wire 18 and its associated elements on a metal plate 4, which itself is permitted expansion and contraction due to ambient temperature changes.

From the foregoing, it will be apparent that the making and breaking of the power circuit for the resistance R is the direct result of the expansion and contraction of the thermal wire 18, which in turn results from the heating effect of the electrical energy passing through it. In a temperature control application such as illustrated, the amount of current traversing the wire 18 must have a predictable and uniform relationship to the temperature of the object being heated by the resistance R. The response of the thermal wire to temperature change of said object is accomplished in the present instance by what I have termed a "bypass" resistor, comprising the resistance element X in the circuit arrangement of Fig. 1. The resistance element per se is suitably housed in a sensing head, arranged in one form to be held in heat exchange relation to a cooking vessel, and in another form, in response to radiant and convected heat in an oven, as well as to heat conducted from the oven wall. The temperature change of the sensing head is transmitted to the resistance element contained therein. The resistance value of the resistance element changes as the resistance temperature changes, and the quantity of current traversing the wire 18 changes pursuant to wel known electrical laws.

Figures 14, 16:
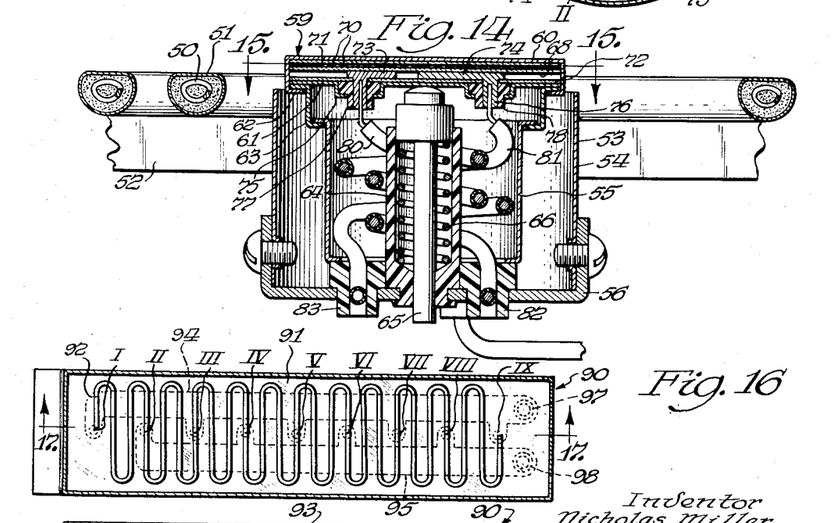
Fig. 14 is a side sectional elevation of a thermal sensing head applied to a surface heating unit of a range.
Fig. 16 is a side elevation of a second form of sensing head which is particularly suited for areas in which response to radiated heat is a factor, such as in an oven.
Figure 15:
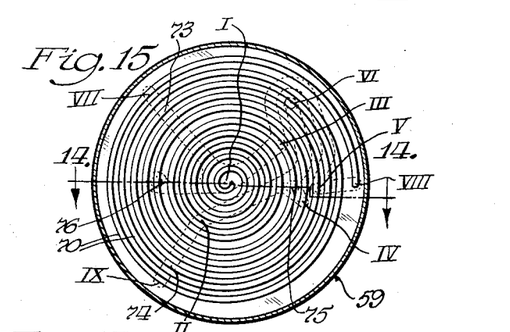
Fig. 15 is a plan sectional view of the sensing head taken on lines 15—15 of Fig. 14.

The bypass or control resistance X is illustrated in two embodiments in Figs. 15 and 16, respectively. In Fig. 15, the control resistance is incorporated in a sensing head for the automatic control of the wattage output of the electric range surface unit in response to the temperature of a cooking vessel on the unit. The sensing head is in heat exchange relation with the bottom wall of the cooking vessel placed on such unit, and therefore is indirectly responsive to the temperature of the foodstuff or other content of the vessel. In the range surface unit R, shown in section in Fig. 14, the resistance element of the unit R comprises the resistance element 50 embedded in a densely compacted mass of thermally conductive and electrically insulating material such as magnesium oxide, which in turn is enclosed in a tubular metallic sheath 51 arranged in flat spiral form, as now well known in the art. The sheathed heating element may be mounted on a spider or other support 52, as shown for example, in the O. G. Vogel Patent No. 2,357,150, granted August 29, 1944, for "Electric Heater." The sensing head 53 is secured to the spider 52 by any suitable means so as to be at the center of the spirally arranged surface unit R. The sensing head is shielded against ambient temperatures; for example, the cylindrical sleeves 54 and 55, respectively, supported by the mounting bracket 56, may be of highly reflective metal and thus thermally insulate the wiring and other portions of the sensing head against the heat radiated by the sheath 51 of the unit R. Bracket 56 is fixed relative to the supporting spider 52 by any suitable means (not shown). The sensing head itself may comprise a capsule 59 having a thin metal cover 60 of aluminum or other material having excellent heat conductivity, and a bottom plate 61 of the same material. An inwardly turned flange 62 of the cover 60 confines a flange portion of a collar 63 which is configurated to slidably and rockably engage sleeve 55. Said sleeve 55 thereby serves to guide the vertical and tilting movements of the capsule. A tubular member 64, preferably of heat-resistant insulating material, is secured to the bracket 56. Said member 64 slidably supports a round-headed pin 65 and confines a spring 66 which surrounds said pin and urges it upwardly against the plate 61. Spring 65 therefore urges the entire capsule 59 upwardly until said capsule engages the outwardly extending flanges or lugs at the top of sleeve 55. This positions the cover of the capsule normally above the plane of the surface heating unit R. The bottom of a cooking vessel (not shown) placed on the heating unit will engage the capsule and move it downwardly against the bias of spring 66 to a position in which the upper surface of the capsule is in, or approximately in, the plane of the surface heating unit as dictated by the degree of flatness of the bottom of the pan. The point contact of the capsule with the spherical head of pin 65 enables the capsule to tilt in any direction. The heat conducting cover of capsule is therefore assured of good contact with the bottom of the cooking vessel.

The bypass resistor is contained within the capsule in such manner as quickly to respond to changes in the temperature of the cover thereof. The bypass resistor is made of a metal, the coefficient of resistance of which increases at a fairly rapid rate with increases of temperature. Commercially pure (99.8%) nickel, and a nickel-iron alloy sold under the trade name "Hytemco" are suitable. For best efficiency, the resistor should be as long as practical considerations permit. A spirally arranged resistor provides satisfactory length in a unit of relatively small diameter. The resistor can advantageously be made by one of the now well known methods employed in the manufacture of printed circuits, such as by electro-plating, vacuum deposition, stamping from a thin foil, or other methods suitable for production of a conductor having a cross sectional area of the other of 0.001 square inch.

It is functionally advantageous to have the bypass resistor comprise a plurality of parallel circuit branches. The larger the number of branches, the smaller may be the mass of the resistance material and hence the more rapidly the resistor will follow the temperature changes of the capsule. It is also important that the current passing through each branch of the circuit be small, thereby reducing the self-heating effect of the passage of current. Finally, the change in resistance produced by temperature change of the resistance material is increased as the number of branches of a parallel resistor circuit is increased. Therefore, increasing the number of branches of the parallel resistor circuit increases the responsiveness and sensitivity of the control device to the temperature changes of the utensil.

In the spiral form of the bypass resistor, illustrated in Figs. 14 and 15, a mica or similar insulating disc 68 carries a continuous spiral resistance strip 70, which is preferably cemented or otherwise permanently secured to said mica disc. To form the spiral resistance element into a number of parallel resistance branches, the sensing head is provided with contact strips which engage the resistance strip at a plurality of spaced points. For example, the spiral resistor is divided into eight segments of equal resistance; Fig. 15 illustrates this by the points designated I to IX. Beneath these points, the mica insulating disc 68 is apertured. A thin mica insulator 71 is placed over the resistance strip to insulate it from the metallic cover element 60 and another mica insulating disc 72 rests upon the capsule base plate 61. Two relatively heavy plate-like conductors, respectively 73 and 74, are secured to the mica disc 72. Said conductors, the shape of which is best shown in Fig. 15, are provided with projections which reach upwardly through the apertures in insulator disc 68 to electrically engage the underside of the resistor 70 at the several points thereof. The conductors 73 and 74 are respectively provided with terminal portions 75 and 76 which are electrically insulated from the capsule member 54 by means such as the insulated bushings 77 and 78. Insulated wire conductors 80 and 81 connected respectively to the terminals 75 and 76 extend spirally within the sleeve 55 and then through conventional strain relief insulators 82 and 83 to connect to the control circuit, as shown in Fig. 14.

Figure 17:
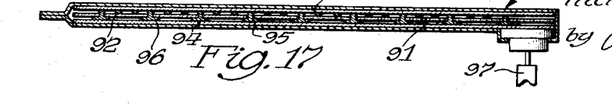
Fig. 17 is a section taken on lines 17—17 of Fig. 16.

Continuing with electric ranges as exemplifying a use for my control device, Figs. 16 and 17 illustrate a bypass resistance unit adapted for insulation in an oven (not shown). It is contemplated that the sensing device embodying the bypass resistor will be placed on a wall of the oven so that it will be exposed to radiated and convected heat. Advantageously, therefore, the sensing device is arranged to have a rather large response area. The relatively thin, flat metallic housing 90 contains a mica or equivalent insulator 91, on which is mounted the sinuously arranged resistor 92, said resistor being insulated from the metallic casing by means such as the mica insulation strip 93. Two conductors, respectively 94, and 95, are secured to an insulating plate 96 and are provided with conductive projections which reach through openings in the insulator 91 to make electrical connection with the resistor 92 at points I to IX thereof, to provide the plurality of parallel resistance circuits as previously described. Terminals 97 and 98 leading from the respective conductors 94 and 95 are provided for connecting the resistor into the oven heating unit control circuit, which, of course, is electrically the same as that previously described with respect to the surface heating unit R.

It will be apparent that with the respective bypass resistors having a relatively high temperature-resistance coefficient, an increase in the temperature of the resistor produces an increase in its resistance value. This reduces the amount of current traversing the bypass resistance and correspondingly increases the passage of current through the thermal wire 18, quickly raising the temperature of said wire. The resulting expansion of the thermal wire actuates the switch contacts 14, 15, to open circuit position, as previously explained. The open switch also interrupts passage of current through the thermal wire 18. The wire thereupon cools, contracts, and causes the load circuit to reclose.

On the other hand, when the temperature of the bypass resistor is relatively low, as it would be when a cold cooking vessel was being brought up to temperature, its relatively low resistance causes proportionately less current to flow through the thermal wire reducing the heating rate of the wire and thus delaying its circuit-opening operation. The operational cycle of the heating load during its heating-up stage is therefore charaterized by longer "on" periods than it is when the bypass resistor is hot and maximum current is drawn by the thermal wire. Thus the heating-up of the cooking vessel to the ultimate control temperature is accelerated by the long energy periods of the surface heating unit or oven heating unit; and when the temperature control point is attained, said temperature is maintained within satisfactory limits by the shorter energy periods resulting from the increased current passing through the thermal wire and the resulting reduction in time for said wire to expand to its current opening condition.

While there has been described what is at present considered to be the preferred embodiment of the invention, it will be understood that various modifications may be made therein, and it is intended to cover in the appended claims all such modifications as fall within the scope of the invention.

I claim:

1. A control device, comprising a casing, switch means in said casing for controlling flow of electrical energy in an electric circuit, a resistance wire of minute thermal mass, means including an expansible and contractable member for mounting said resistance wire under tension in said casing, said member being electrically insulated from said resistance wire and having a coefficient of linear expansion approximately that of said wire, whereby to minimize the effect on the tension of the wire of temperature ambient to said casing, means including a fastening element slidably carried by said casing for mounting said member for expansion and contraction relative to said casing, means including said switch means for effecting flow of or interruption of flow of electrical energy through said resistance wire concomitantly with the flow or interruption of flow of electrical energy through said circuit, whereby said resistance wire will heat and expand or cool and contract according to whether said switch means is closed or open, means responsive to the length of the resistance wire for operating said switch means between closed and open positions, and means for selecting a datum length of the resistance wire from which departure will effect operation of said switch means.

2. A control device, comprising a casing, switch means in said casing for controlling flow of electrical energy in an electric circuit, a resistance wire of minute thermal mass, a rigid plate member having a coefficient of expansion similar to that of the resistance wire, means for mounting said plate member in said casing for linear expansion and contraction relative thereto, means including electrical insulation elements interposed between end portions of said resistance wire and said expansible and contractable plate member for mounting said resistance wire under tension in said casing whereby the expansion and contraction of said plate member will minimize the effect on the tension of the wire of temperature ambient to said casing, means comprising a lever carried by said plate member and one of said electrical insulation elements for placing said resistance wire under a desired tension, means including said switch means for effecting flow of or interruption of flow of electrical energy through said resistance wire concomitantly with the flow or interruption of flow of electrical energy through said circuit, whereby said resistance wire will heat and expand or cool and contract according to whether said switch means is closed or open, flexible blade means pivotally mounted within said casing for operating said switch means between closed and open positions, means for rotating said blade means in switch opening or closing direction in response to the expansion or contraction of said resistance wire, and means for selecting a datum length of the resistance wire from which departure will actuate said blade means to effect operation of said switch means.

3. A control device, comprising a casing, switch means in said casing for controlling flow of electrical energy in an electric circuit, means for biasing said switch means to assume a preselected circuit condition, a resistance wire of minute thermal mass, means including an expansible and contractable member being electrically insulated from said resistance wire and for mounting said resistance wire under tension in said casing, said member having a coefficient of linear expansion approximately that of said wire, whereby to minimize the effect on the tension of said wire of temperature ambient to said wire and mounting member, means including said switch means for effecting flow or interruption of flow of electrical energy through said resistance wire concomitantly with the flow or interruption of flow through said circuit, whereby said resistance wire will heat and expand or cool and contract according to whether said switch means is closed or open, flexible blade means pivotally mounted within said casing, said blade means having an element engageable with said switch means for operating the latter to a different circuit condition, means including a lever insulatedly carried by said resistance wire and engaging said blade means for operating said blade means in switch means engaging or disengaging direction in response to the extent and direction of the change in length of said resistance wire, and means for selecting a datum length of resistance wire from which departure will operate said blade means.

4. A control device according to claim 3, in which overthrow spring means within said casing actuates said blade means with a snap action and the said switch means engaging element of said blade means has an interval of free travel during said blade means actuation before engaging with said switch means.

5. A control device according to claim 3, in which said expansible and contractable member includes lever means rotatably carried thereby to support an end portion of said resistance wire, and adjustment screw means for effecting rotation of said wire-supporting lever means to establish a desired tension in said resistance wire.

6. A control device, comprising a casing, a flexible blade disposed within said casing, means engaging said blade near one end thereof for pivotally mounting said blade within said casing, switch means operatively associated with the free end of said blade for operation thereby between open and closed circuit positions according to the direction of rotation of said free end, an expansion spring anchored within said casing and engaging said blade remote from the free end thereof to urge the same into rotation, means engaging said blade intermediate said spring means and the free end of said blade to provide a fulcrum point between which and said pivotal mounting said blade is flexed by the effort of said expansion spring, means for positioning said fulcrum point relative to the plane of said pivotal mounting to establish the amount of extension of said expansion spring means to produce a flexure of said blade free end for operation of said switch means, an electrical conductor disposed within said casing, a frame plate mounted within said casing for expansion and contraction relative thereto, means comprising electrical insulation elements carried by said frame plate and engaging said conductor at the respective ends thereof to support said conductor relative to said frame plate, means including said switch means for passing an electric current through said conductor to cause the heating and resultant expansion thereof, electrical insulation means mounted on said conductor, rigid terminal means fixed to one end of said conductor and pivotally engaging said last-named insulation means, rigid lever means carried by said last-named insulation means and extending into engagement with said flexible blade for opposing the expansion of said spring whereby rotation of said rigid lever means toward or away from said spring is effected according to whether said electrical conductor is expanding or contracting and the effort of said expansion spring to flex said blade is thereby related to the length of said conductor.

7. A control device according to claim 6, in which said rigid lever means engages said flexible blade directly opposite the point of engagement of said expansion spring with said flexible blade.

8. A control device, comprising a casing, switch means in said casing for controlling flow of electrical energy in an electric circuit, a flexible blade mounted at one end thereof within said casing, actuator means on the free end of said blade for operating said switch means between open and closed circuit positions according to the direction of movement of said blade free end, a resistance wire of minute thermal mass, means for mounting said resistance wire within said casing for expansion and contraction therein, means including said switch means for effecting flow of or interruption of flow of electrical energy through said resistance wire concomitantly with the flow or interruption of flow of electrical energy through said circuit, whereby said resistance wire will heat and expand or cool and contract according to whether said switch means is closed or open, means engaging with a face of said flexible blade to establish a flexure point intermediate the ends thereof, spring means engaging said blade at the opposite face thereof intermediate the mounting end of said lever and said flexure point and exerting continuous pressure against said blade to flex it in a direction urging the free end of said blade to effect a predetermined operative condition of said switch means, a rigid lever pivotally mounted within said casing and engaging said flexible blade in opposition to said spring means, means carried by said resistance wire and engaging with said rigid lever to rotate the same relative to said flexible blade according to the expansion or contraction of said resistance wire, whereby the net effort of said spring means on said flexible blade and the resultant movement of said blade free end necessary to effect operation of said switch is a function of the extent and direction of change of length of said resistance wire, and means for axially adjusting said flexure point establishing means toward or away from said flexible blade.

9. A control device, comprising a casing, a first switch means in said casing for controlling flow of electrical energy in an electric circuit, a flexible blade mounted at one end thereof within said casing actuator means on the free end of said blade for operating said switch means between open and closed circuit positions according to the direction of movement of said blade free end, a resistance wire of minute thermal mass, means for mounting said resistance wire within said casing for expansion and contraction therein, means including said switch means for effecting flow of or interruption of flow of electrical energy through said resistance wire concomitantly with the flow or interruption of flow of electrical energy through said circuit, whereby said resistance wire will heat and expand or cool and contract according to whether said switch means is closed or open, means engaging with a face of said flexible blade to establish a flexure point intermediate the ends thereof, spring means engaging said blade at the opposite face thereof intermediate the mounting end of said blade and said flexure point and exerting continuous pressure against said blade to flex it in a direction urging the free end of said blade to effect a predetermined operative condition of said switch means, a lever pivotally mounted within said casing and engaging said flexible blade in opposition to said spring means, means carried by said resistance wire and engaging with said lever to rotate the same relative to said flexible blade according to the expansion or contraction of said resistance wire, whereby the net effort of said spring means on said flexible blade and the resultant movement of said blade free end necessary to effect operation of said switch is a function of the extent and direction of change of length of said resistance wire, means for axially adjusting said flexure point establishing means toward or away from said flexible blade, and means whereby movement of said flexure point establishing means to a pre-established position moves said blade to switch-opening position regardless of the length of said resistance wire.

10. A control device according to claim 9, in which a second switch means within said casing also controls flow of electrical energy in said electric circuit, and movement of said flexure point establishing means to a predetermined position actuates both said first and second switch means to open circuit condition.

11. A control device, comprising a casing, a first switch means in said casing, means for connecting said switch means in an electric power circuit supplying an energy-using device, whereby the flow of energy thereto is dependent on the closure of said switch means, a flexible blade member mounted at one end thereof within said casing, actuator means on the free end of said blade member for operating said switch means between open and closed circuit positions according to the direction of movement of said actuator means, expansion spring means secured within said casing and engaging a face of said blade member intermediate its ends to rotate said blade in a direction effecting closure of said switch means, a resistance wire mounted under tension in said casing for expansion and contraction relative thereto, said wire being connected in series in said power circuit, whereby said wire will heat and expand or cool and contract according to whether said switch means is closed or open, a rigid lever mounted within said casing and engaging a face of said blade member in opposition to said spring means, means mechanically associating said resistance wire and said rigid lever to effect rotation of said lever in directions increasing the opposition to said spring when said wire is contracting and decreasing said opposition when said wire is expanding, a second electric circuit including switch means, said second circuit being effective to shunt said resistance wire out of said first circuit, means engageable with said blade face for providing a flexure point between which and the mounting end of said blade said spring acts to flex said blade to urge the free end thereof in a direction effecting the opening of said first named switch, means for withdrawing said flexure point establishing means relative to said blade to permit said spring to operate said blade in a direction closing said first named switch, and means whereby the withdrawal of said flexure point establishing means to a predetermined position will effect closure of said switch in said shunting circuit.

12. A control device, comprising a casing, a first switch means in said casing, means for connecting said switch means in an electric power circuit supplying an energy-using device, whereby the flow of energy thereto is dependent on the closure of said switch means, a flexible blade member mounted at one end thereof within said casing, means for operating said switch means between open and closed circuit positions according to the direction of movement of the opposite end of said blade, expansion spring means secured within said casing and engaging a face of said blade member intermediate its ends to rotate said blade in a direction effecting closure of said switch means, a resistance wire mounted in said casing and connected in series in said power circuit, means for mounting said resistance wire for expansion and contraction relative to said casing, whereby said wire will heat and expand or cool and contract according to whether said switch means is closed or open, a rigid lever mounted within said casing and engaging a face of said blade member in opposition to said spring means, said rigid lever mechanically associated with said resistance wire-mounting means to effect rotation of said lever in directions increasing the opposition to said spring when said wire is contracting and decreasing said opposition when said wire is expanding, an electric circuit connected relative to said first circuit and said resistance wire to shunt said resistance wire out of said first circuit, normally open switch means for normally disconnecting said shunting circuit, means carried by said last named switch means and engageable with said blade face for providing a flexure point between which the mounting end of said blade said spring acts to flex said blade to urge the same in a direction effecting the opening of said first named switch, means for withdrawing said flexure point establishing means to permit said spring to operate said blade in a direction closing said first named switch, and means biasing said second named switch to closed circuit position upon the withdrawal of said flexure point establishing means to a predetermined position.

13. Means for controlling the energy periods of a heating element of the resistance wire type in relation to the temperature of an object in heat exchange relation therewith, comprising an electric circuit including terminal means for connecting said heating element to an external source of electrical energy, switch means in said circuit for interrupting or completing said circuit, an electrical conductor of minute cross sectional area, yieldable means for supporting said conductor at its respective ends to place the same under tension, means for connecting said conductor by way of said switch means into said heating element circuit to receive electrical energy concomitantly with said heating element, said conductor being of such material that it expands upon increase in temperature accompanying passage of electrical energy therethrough, means responsive to the expansion and contraction of said conductor as it heats and cools with the passage of, or interruption of, electrical energy therethrough to operate said switch means between open and closed circuit positions respectively, resistance means arranged for disposition in heat exchange relation to said object, said resistance means including a plurality of individual resistors mutually electrically connected in parallel and respectively having a temperature-resistance coefficient whereby change in temperature of said resistors produce a measurable change in the resistance thereof, means for insulatedly housing said resistors, said housing being formed of material having high thermal conductivity, means for resiliently urging said housing into direct heat transfer relationship with an object being heated by said heating element, and an electric control circuit including said resistance means and said electrical conductor to establish the quantity of flow of electrical energy through said conductor and the resultant rate of heating thereof as a function of the temperature of said resistor housing means and the resistance means incorporated therein.

14. Controlling means according to claim 13, in which said resistance means comprises a resistance element of low thermal mass and arranged in flat spiral form, a pair of mutually insulated electrical conductors, each of said conductors electrically contacting said resistance element at a plurality of locations to form the said plurality of individual resistors in parallel electrical relationship, and means for connecting said conductors in said control circuit.

15. Controlling means according to claim 13, in which said resistance means comprises an elongated resistance element of low thermal mass disposed on an insulating plate, a pair of mutually insulated electrical conductors disposed on the opposite face of said insulating plate, each of said conductors having conductor elements extending through said plate to electrically contact said resistance element at a plurality of locations to form said plurality of resistors in parallel electrical relationship, and means for connecting said conductors in said control circuit.

References Cited in the file of this patent

UNITED STATES PATENTS

| | | |
|---|---|---|
| 1,946,894 | Brogger | Feb. 13, 1934 |
| 2,025,292 | Lockett | Dec. 24, 1935 |
| 2,243,563 | Hottenroth | May 27, 1941 |
| 2,320,117 | Ayers | May 25, 1943 |
| 2,354,933 | Winborne | Aug. 1, 1944 |
| 2,689,289 | Bell | Sept. 14, 1954 |
| 2,758,190 | Raney | Aug. 7, 1956 |
| 2,767,295 | Cutler | Oct. 16, 1956 |